United States Patent [19]

Zilch et al.

[11] 4,032,460

[45] June 28, 1977

[54] INHIBITION OF SCALE DEPOSITION IN HIGH TEMPERATURE WELLS

[75] Inventors: Horst E. Zilch, Yorba Linda; Paul W. Fischer, Whittier, both of Calif.

[73] Assignee: Union Oil Company of California, Brea, Calif.

[22] Filed: Oct. 28, 1975

[21] Appl. No.: 625,814

[52] U.S. Cl. .................... 252/8.55 B; 166/244 C; 166/279; 166/310; 210/58; 252/180

[51] Int. Cl.² .................... C02B 5/06; C23F 15/00

[58] Field of Search ........ 252/8.55 B, 180, DIG.11; 210/58; 260/293.86, 268 C; 166/244 C, 310

[56] References Cited

UNITED STATES PATENTS

| | | | |
|---|---|---|---|
| 3,130,153 | 4/1964 | Keller | 252/180 X |
| 3,557,001 | 1/1971 | Stanford et al. | 252/8.55 X |
| 3,597,352 | 8/1971 | Stanford et al. | 252/8.55 |
| 3,620,974 | 11/1971 | Stanford et al. | 252/8.55 |
| 3,661,787 | 5/1972 | Brown | 252/109 |
| 3,696,044 | 10/1972 | Rutledge | 252/180 |
| 3,776,851 | 12/1973 | Cheng | 252/89 |
| 3,794,596 | 2/1974 | Tate | 252/180 |
| 3,951,794 | 4/1976 | Swearingen | 210/58 |

*Primary Examiner*—Herbert B. Guynn
*Attorney, Agent, or Firm*—Richard C. Hartman; Dean Sandford; Gerald L. Floyd

[57] ABSTRACT

A method of inhibiting the formation of scale from aqueous solutions containing scale-forming ions at temperatures of up to 400° F. and above during production and utilization of such aqueous solutions comprising adding to the solutions certain amines, amides, thioamides, carboxylic acids or amide reaction products of carboxylic acids and various amines.

10 Claims, No Drawings

INHIBITION OF SCALE DEPOSITION IN HIGH TEMPERATURE WELLS

BACKGROUND OF THE INVENTION

1. Field of the Invention

This invention relates to a method for preventing the deposition of scale in subterranean formations or in well fluid-gathering metal equipment exposed to high temperature aqueous media. More particularly the invention relates to such a method for preventing the deposition of scale onto formation rock or metal surfaces from high temperature brines or geothermal fluids containing calcium and other sacle-forming ions during production of such fluids from a subterranean formation via a well and the subsequent utilization of the produced fluid.

2. Description of the Prior Art

Brine is often produced from subterranean formations, as through wells primarily intended for production of oil. If the well penetrates a deep subterranean formation, the brine and oil produced will be at an elevated temperature.

One source of recoverable natural energy is geothermal energy stored in hot subterranean formations. One way of utilizing this geothermal energy involves drilling one or more wells into a subterranean formation which may contain either a geothermal fluid or hot dry rocks. If it contains a geothermal fluid, the fluid may be produced via a well. If it contains only hot dry rocks, a relatively low temperature heat exchange fluid is passed through the formation and recovered via a well after it has been heated by the rocks. In either instance, the process involves, in part, the production of geothermal fluids from the formation to the surface via a well and subsequent handling of the fluid to utilize the geothermal energy. Such utilization may involve electric power generation by using the geothermal energy to drive a turbine, passing the fluid through a helical rotary screw expander power system, use in a binary power cycle with a working fluid such as isobutane in a regenerative heat exchanger, or direct utilization for its heat, water or minerals content, for space heating or process heating.

Within the formation, brine and geothermal fluids are at high temperatures and pressures. Under such conditions, these aqueous liquids characteristically contain considerable amounts of various dissolved salts. The production and subsequent utilization of these fluids involve passing them through the formation to a well and then through metal conduits and other fluid handling equipment. During this time, the fluid cools and the pressure is reduced. When this change in condition occurs, the dissolved salts tend to precipitate, adhere to the solid rock or metal surfaces with which they come in contact, and build up in thickness so as to eventually cause plugging of the formation and/or the fluid handling equipment and/or a reduction in the heat transfer properties of the system.

A wide variety of materials have been proposed for addition to hot aqueous fluids to inhibit scale formation as the fluids cool. However, more effective scale inhibitors are still desired.

It is known from U.S. Pat. No. 2,599,342 issued June 3, 1952 to Victor G. Meadors to add primary, secondary and tertiary aliphatic and cycloaliphatic amines having up to 15 carbon atoms, such as piperidine, diethyl amine and diethanol amine, to aqueous base drilling fluid as thickening agents. It is also known from U.S. Pat. No. 2,603,598 issued July 15, 1952 to Victor G. Meadors to add an alkanol amine, i.e., a mono-, di- or trihydroxy amine having not more than 15 carbon atoms to an aqueous base drilling fluid to overcome the adverse effect of calcium and magnesium salts on the fluid loss properties of the drilling fluid. U.S. Pat. No. 2,331,280 issued Oct. 12, 1943 to Truman B. Wayne describes, as an additive to reduce the viscosity of an aqueous base drilling fluid, an ester of a strong water-soluble polybasic acid, such as polybasic phosphoric acid, a hydrophile-polyhydroxy body, such as a polyhydroxy-carboxylic acid, and a strongly basic amine, such as an alkyl, cycloalkyl, alkylated or arylated amine. None of these references are concerned with inhibition of scale formation, hot brine or geothermal fluids.

Accordingly, a principal object of this invention is to provide a method for inhibiting the formation of scale from hot brine and geothermal fluids during their production from subterranean formations and subsequent handling.

Another object of the invention is to provide such a method for inhibiting the formation of a calcium-containing scale onto the metal surfaces of aqueous fluid production and fluid handling equipment.

A further object of the invention is to provide such a method for inhibiting the formation of scale from liquid-containing geothermal fluids having temperatures above about 400° F.

It is a still further object of the invention to provide such a method for inhibiting the deposition of scale from high temperature wet steam.

Other objects, advantages and features will become apparent from the following description and appended claims.

SUMMARY OF THE INVENTION

A method of inhibiting the formation of scale from high temperature brines and geothermal fluids having a temperature of up to 400° F. and above and containing scale-forming ions in solution or suspension onto the subterranean formation rock or the metal surfaces of equipment used to produce and handle such aqueous fluids comprising adding to the aqueous fluid prior to or during its production and/or handling a water-soluble organic compound selected from the group consisting of dicarboxylic acids, lower alkyl esters of dicarboxylic acids, hexamethylenetetramine, thiourea and the amide reaction products of polycarboxylic acids and aliphatic amines, aliphatic hydroxyl amines and heterocyclic nitrogen-containing compounds.

DESCRIPTION OF THE PREFERRED EMBODIMENTS

During production of a hot pressurized aqueous fluid containing or comprised of liquid water having dissolved therein scale-forming ions from a subterranean formation, scale can form at any of a number of locations, such as in the interstices of the formation rock itself as the fluid moves towards a well, in the production conduit of the well or in the fluid-handling equipment at the surface. To retard scale formation, a scale inhibitor must be mixed with the aqueous fluid before scale formation occurs. Thus, in some instances, it may be necessary to inject the inhibitor into the formation via the production well or via an offset well.

If a production well is utilized, production is periodically suspended and the well converted to an injection well until a quantity of inhibitor has been injected out into the formation after which time the well is again placed on production. If an offset well is utilized for injection of the inhibitor, production at the production well may be either continued or suspended during the injection period. In other instances it is sufficient to inject inhibitor into the bottom of the well, i.e., below the bottom end of the production tubing, where it mixes with formation fluid before being produced up the tubing. In still other instances, the inhibitor can be blended into a produced fluid at the surface before such fluid passes through utilization equipment.

The scale-forming ions most commonly found in brines and geothermal fluids are the alkaline earth metal cation, such as calcium, magnesium and barium and various anions such as carbonate, bicarbonate, sulfate, phosphate, oxalate and silicate. When combinations of these anions and cations are present in concentrations which exceed the solubility of their reaction product, precipitation of solids which build up to form scale will occur.

Water-soluble organic compounds which function as scale inhibitors in high temperature geothermal and brine-producing wells include various dicarboxylic acids and derivatives thereof. Saturated aliphatic dicarboxylic acids having from about 2 to about 10 carbon atoms may be used. Such acids include oxalic, malonic, succinic, glutaric, adipic, suberic and sebacic. Hydroxy-substituted saturated aliphatic dicarboxylic acids, such as tartaric acid can also be used. Likewise, lower alkyl esters of dicarboxylic acids, such as dimethylsuccinate, function as scale inhibitors.

Further scale inhibitors are thiourea, hexamethylenetetramine and the amide reaction products of polycarboxylic acids and various nitrogen-containing organic compounds. The polycarboxylic acids can be the same dicarboxylic acids and hydroxy-substituted dicarboxylic acids described above as well as saturated aliphatic tricarboxylic acids, such as citric acid. The nitrogen-containing organic compounds with which the polycarboxylic acid can be reacted are: (1) primary and secondary saturated aliphatic amines having from about 2 to about 8 carbon atoms, such as ethylamine, butylamine, hexylamine, cyclohexylamine, heptylamine, octylamine, di-n-butylamine, di-n-propylamine, propane-(1,3)-diamine, 3-dimethylaminopropylamine, and 3-diethylaminopropylamine; (2) saturated aliphatic hydroxyl amines containing from about 2 to about 10 carbon atoms, such as monoethanolamine, diethanolamine, triethanolamine and aminoethanolamine; and (3) 5- or 6-member ring saturated heterocyclic compounds containing, in part, either nitrogen or both nitrogen and oxygen, such as piperidine, pyrrolidine, piperazine, morpholine and 2,6-dimethylmorpholine.

The amides are prepared according to well known techniques by reacting 1 mol polycarboxylic acid with a number of mols primary or secondary amine, hydroxylated amine or other nitrogen-containing compound equal to the number of carboxylic groups in the polycarboxylic acid. Thus, for a dicarboxylic acid, 1 mol acid is reacted with 2 mols amine. Often about a 0.5 mol excess of amine is used to insure that the reaction goes to completion. The reaction is carried out in an inert organic solvent. For example, 59 grams (0.5 mol) succinic acid is dissolved in 400 milliliters dioxane solvent and heated to 214° F., the boiling point of dioxane. To this solution is added dropwise with stirring, 128 grams (1.5 mols) piperidine dissolved in 250 milliliters dioxane. The temperature of the exothermic reaction is held at 214° F. After all of the piperidine solution has been added, the reaction is stirred for an additional 30 minutes, cooled and the precipitated reaction product, the dipiperidine amide of succinic acid, filtered off and recrystallized from methanol/ethylacetate. The product yield is 69 grams.

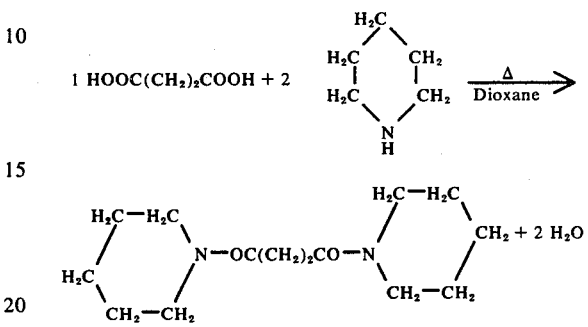

The inhibitor can be added in concentrated form to the aqueous media containing the scale-forming ions or it can be utilized in the form of an aqueous solution. Where concentrations of inhibitor required are small, dilution of 1 barrel of inhibitor with 50 or more barrels of fresh water forms an inhibitor-containing solution which may be added readily to scale-forming compositions.

The concentration of inhibitor required depends to a large extent on the concentration of scale-forming ions in the aqueous solution to be treated and the severity of change of conditions in the said aqueous solution during its production and subsequent utilization. Generally from about 10 to about 250 parts per million inhibitor added to the aqueous fluid gives satisfactory inhibition of scale deposition, i.e., serves as a scale-inhibiting amount of inhibitor.

The invention is further described by the following examples which are illustrative of specific modes of practicing the invention and are not intended as limiting the scope of the invention defined by the appended claims.

EXAMPLE 1

The effectiveness of a series of scale inhibitors is /determined by adding 250 parts per million of various inhibitors to a series of 200 milliliter samples of water containing 200 milligrams per liter calcium ion added as calcium chloride and 200 milligrams per liter carbonate ion added as sodium carbonate. The test solution is 0.005 molar in calcium and in carbonate. The samples are placed in a 450 milliliter pressure reaction vessel consisting of an 8 ounce wide-mouth bottle with a polytetrafluoroethylene liner and a metal cap contained within a stainless steel pressure vessel. The void space in the pressure vessel outside the bottle is partially filled with 85 milliliters of water. The pressure vessel is sealed, heated to 400° F. in an oven and rotated at 16 revolutions per minute for 16 hours. After this time, the oven is turned off, the oven door opened and the sample allowed to rotate for an additional 1.5 hours while partially cooling. The pressure vessel is then removed from the oven, cooled to room temperature, opened and allowed to stand for one hour to allow any calcium carbonate scale formed to settle. The concentration of soluble calcium ion remaining in solution is determined by flame emission spectroscopy on a 5 milliliter portion of the supernatant liquid of the sample diluted with 200 milliliters of an aqueous solution containing 6 grams potassium chloride per gallon of distilled water. The results of the tests are shown in the following Table. The results are expressed in terms of "Calcium Ion Maintained in Solution (milligrams/liter)". The more effective inhibitors keep a higher concentration of the calcium ion in solution.

TABLE

EFFECTIVENESS OF INHIBITORS IN MAINTAINING CALCIUM IONS IN SOLUTION AT 400° F. FOR 16 HOURS

| Run | Inhibitor (250 ppm) | Calcium Ion Maintained in Solution (milligrams/liter) |
|---|---|---|
| 1 | None | 25 |
| 2 | Succinic acid | 94 |
| 3 | Tartaric acid | 41 |
| 4 | Succinamide | 50 |
| 5 | Dimethylsuccinate | 43 |
| 6 | Thiourea | 61 |
| 7 | Hexamethylenetetramine | 61 |
| 8 | Reaction product of succinic acid and hexylamine | 40 |
| 9 | Reaction product of succinic acid and cyclohexylamine | 31 |
| 10 | Reaction product of succinic acid and heptylamine | 40 |
| 11 | Reaction product of succinic acid and octylamine | 41 |
| 12 | Reaction product of succinic acid and di-n-butylamine | 54 |
| 13 | Reaction product of succinic acid and di-n-propylamine | 73 |
| 14 | Reaction product of succinic acid and propane-(1,3)-diamine | 39 |
| 15 | Reaction product of succinic acid and monoethanolamine | 33 |
| 16 | Reaction product of succinic acid and diethanolamine | 45 |
| 17 | Reaction product of succinic acid and aminoethylethanolamine | 44 |
| 18 | Reaction product of succinic acid and 3-dimethylaminopropylamine | 42 |
| 19 | Reaction product of succinic acid and 3-diethylaminopropylamine | 36 |
| 20 | Reaction product of succinic acid and pyrrolidine | 51 |
| 21 | Reaction product of succinic acid and piperidine | 85 |
| 22 | Reaction product of succinic acid and piperazine | 92 |
| 23 | Reaction product of succinic acid and morpholine | 56 |
| 24 | Reaction product of succinic acid and 2,6-dimethylmorpholine | 48 |
| 25 | Reaction product of adipic acid and diethanolamine | 45 |
| 26 | Reaction product of citric acid and diethanolamine | 45 |
| 27 | Reaction product of tartaric acid and diethanolamine | 42 |
| 28 | Reaction product of tartaric acid and morpholine | 34 |

EXAMPLE 2

A geothermal well initially produces a mixture of steam and a brine containing calcium ions. After several months of production, the production rate declines sharply due to partial plugging of the production tubing by calcium carbonate scale. The tubing in the well is replaced with new tubing. A one inch diameter macaroni tubing string is run down the annular space between the tubing and the casing to a point just below the bottom ends of the tubing. Production of geothermal fluids through the tubing is resumed. At the same time, there is continuously metered down the macaroni string 1 barrel/day of the amide reaction product of succinic acid and piperazine scale inhibitor diluted with 20 barrels/day fresh water. After eight months additional production, the well is still producing substantially the same quantity of steam as at the start of the injection of the scale inhibitor. This indicates that there is no appreciable scale build up in the production system.

Various embodiments and modifications of this invention have been described in the foregoing specification, and further modifications will be apparent to those skilled in the art. Such modifications are included within the scope of this invention as defined by the following claims.

Having now described our invention, we claim:

1. A method for inhibiting the formation of scale from hot aqueous fluids having a temperature of about 400° F. and above, which comprises adding to the hot aqueous fluid a scale-inhibiting amount of a scale inhibitor comprising a water-soluble organic compound selected from the group consisting of thiourea, hexamethylenetetramine, dimethylsuccinate and the amide reaction products of unsubstituted saturated aliphatic dicarboxylic acids containing from about 2 to about 10 carbon atoms tartaric acid, or citric acid with unsubstituted saturated aliphatic primary and secondary amines having from about 2 to about 8 carbon atoms, propane-(1,3)-diamine, 3-dimethylaminopropylamine, 3-diethylaminopropylamine, hydroxylated amine derivatives selected from the group consisting of monoethanolamine, diethanolamine, and aminoethanolamine or saturated nitrogen-containing heterocyclic compounds selected from the group consisting of piperidine, pyrrolidine, piperazine, morpholine and 2,6-dimethylmorpholine.

2. The method defined in claim 1 wherein the concentration of said water-soluble organic compound is from about 10 to about 250 parts per million.

3. The method defined in claim 1 wherein said hot aqueous fluid is wet steam.

4. The method defined in claim 1 wherein said scale inhibitor is added to the hot aqueous fluid in a subterranean reservoir by injecting said scale inhibitor into said reservoir through a well penetrating said reservoir.

5. The method defined in claim 1 wherein said hot aqueous fluid is produced from a subterranean formation through a well penetrating said formation, and said scale inhibitor is added to the hot aqueous fluid in said well.

6. The method defined in claim 1 wherein said hot aqueous fluid is a geothermal fluid produced from a subterranean geothermal formation through a well penetrating said formation, and said scale inhibitor is added to said geothermal fluid at the surface.

7. The method defined in claim 1 wherein the dicarboxylic acid is succinic acid.

8. In the method of producing geothermal fluids from a subterranean geothermal reservoir penetrated by a well in which the geothermal fluids containing scale-forming constituents are caused to flow up the well to the surface for subsequent recovery of heat from said geothermal fluids, the improvement which comprises adding to said geothermal fluids in said well at a subsurface location from about 10 to about 250 parts per million of a scale inhibitor comprising a water-soluble organic compound selected from the group consisting of thiourea, hexamethylenetetramine, dimethylsuccinate and the amide reaction products of unsubstituted saturated aliphatic dicarboxylic acids containing from about 2 to about 10 carbon atoms, tartaric acid, or citric acid with unsubstituted saturated aliphatic primary and secondary amines having from about 2 to about 8 carbon atoms, propane- (1,3) -diamine, 3-dimethylaminopropylamine, 3-diethylaminopropylamine, hydroxylated amine derivatives selected from the group consisting of monoethanolamine, diethanolamine, and aminoethanolamine or saturated nitrogen-containing heterocyclic compounds selected from the group consisting of piperidine, pyrrolidine, piperazine, morpholine and 2,6-dimethylmorpholine.

9. In the method of producing geothermal fluids from a subterranean geothermal reservoir penetrated by a well in which the geothermal fluids containing scale-forming constituents are caused to flow up the well to the surface for subsequent recovery of heat from said geothermal fluids, the improvement which comprises adding to said geothermal fluids in said well at a subsurface location from about 10 to about 250 parts per million of an aqueous solution of a scale inhibitor comprising the amide reaction product of succinic acid and a 5- or 6-member ring saturated nitrogen-containing heterocyclic compound selected from the group consisting of piperidine, pyrrolidine, piperazine, morpholine and 2,6-dimethylmorpholine.

10. In the method of producing geothermal fluids from a subterranean geothermal reservoir penetrated by a well in which the geothermal fluids containing scale-forming constituents are caused to flow up the well to the surface for subsequent recovery of heat from said geothermal fluids, the improvement which comprises adding to said geothermal fluids in said well at a subsurface location from about 10 to about 250 parts per million of an aqueous solution of a scale inhibitor comprising the amide reaction product of succinic acid and piperidine or piperazine.

* * * * *